Dec. 1, 1953 — D. P. MARQUIS — 2,660,905
IDLER ARM
Filed Feb. 25, 1950
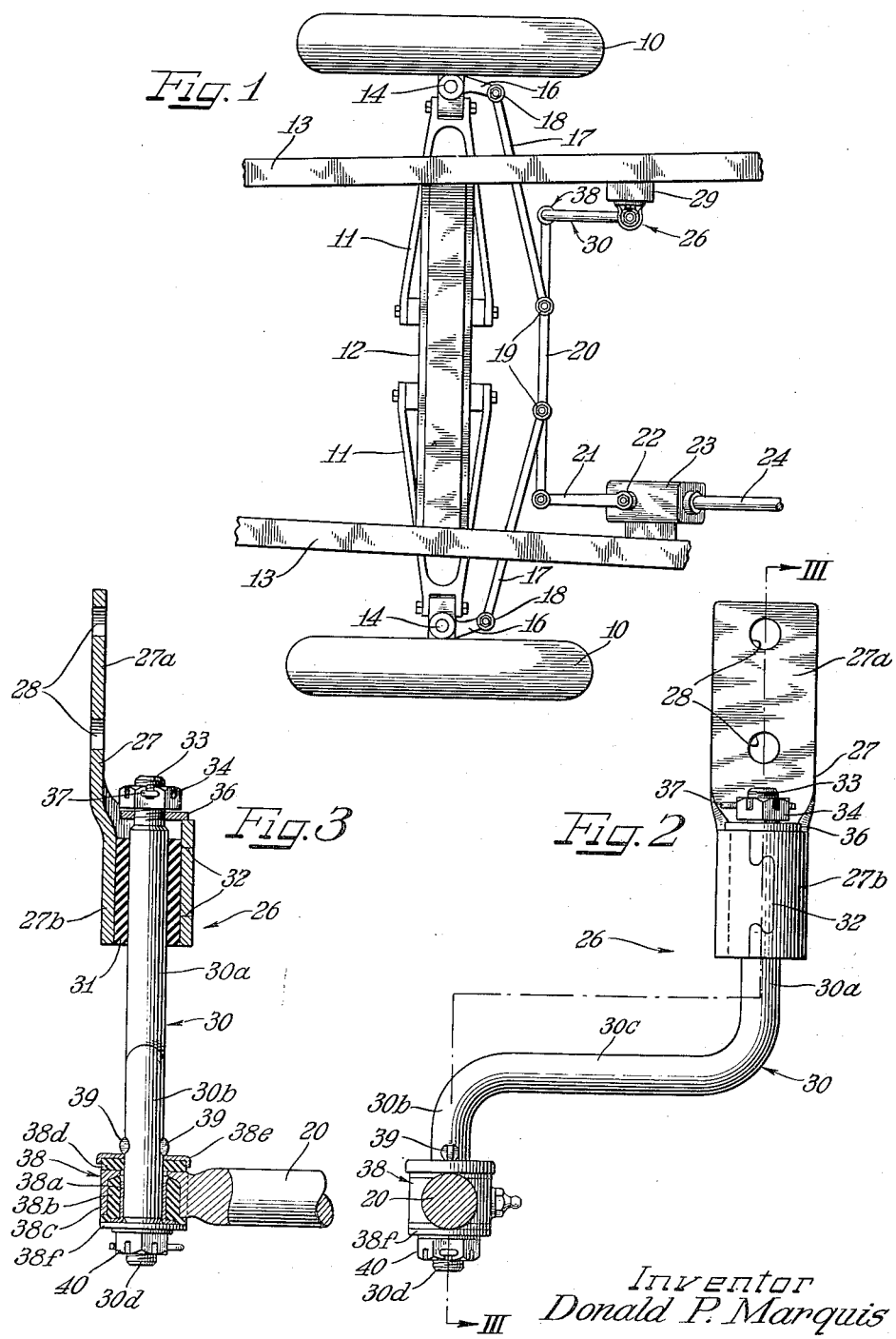
Inventor
Donald P. Marquis Patented Dec. 1, 1953

2,660,905

UNITED STATES PATENT OFFICE 2,660,905

IDLER ARM

Donald P. Marquis, Ferndale, Mich., assignor to Thompson Products, Inc., Cleveland, Ohio, a corporation of Ohio Application February 25, 1950, Serial No. 146,191

12 Claims. (Cl. 74—579)

1

This invention relates generally to the steering mechanism of a dirigible vehicle and more particularly relates to an idler arm for a steering linkage which incorporates a resilient elastic bearing permitting relative angular movement between two elements without necessitating relative movement between bearing surfaces thereof.

Many automotive vehicles employ a parallelogram steering linkage in which a cross link is actuated at one end by a pitman arm operatively connected to the gear box of a steering column. The other end of the cross link is supported by an idler arm so as not to interfere with the straight longitudinal movement of the cross link by the pitman arm.

According to the features of the present invention, a bracket is attached to the frame of a vehicle and this bracket is provided with a housing portion adapted to retain a resilient elastic bearing sleeve. The idler arm takes the form of a shaped bar of steel suitably bent to bring the linkage into the proper relationship with the bracket and is inserted within the bearing sleeve.

Since the housing portion of the bracket, the resilient elastic sleeve and the idler arm are in snug relationship with one another, the motion of the idler arm, which normally may be through an arc of approximately 90°, will cause no movement between bearing surfaces but will produce only a torsional movement in the bearing sleeve.

It is, therefore, an object of the present invention to provide a bearing joint wherein relative rotation between elements of the joint will produce a torsional movement in a resilient elastic sleeve or bushing but will not produce a relative movement between bearing surfaces.

Another object of the invention is to provide a bearing joint for an idler arm in a vehicular steering linkage which will substantially preclude the magnification or transmittal of rattling noises which originate in the steering linkage of a vehicle.

A further object of the present invention is to provide a bearing joint for the idler arm of a vehicular steering linkage in which the elements are assembled in a predetermined fixed relationship so that binding and freezing between bearing surfaces is substantially precluded even though limited angular displacement of the idler arm occurs.

Yet another object of the present invention is to provide an idler arm assembly for a vehicular steering assembly which may be economically produced from a reduced number of simplified elements.

Still another object of the present invention is to provide a bearing joint for an idler arm of the vehicular steering assembly which does not require lubrication.

Yet another object of the present invention is to provide a novel method of manufacturing an idler arm and mounting the idler arm between a vehicular steering linkage and a vehicle frame, whereby the linkage may be supported in a proper geometric relationship relative to a pitman arm connected to another portion of the vehicular steering linkage.

Many other features, advantages and additional objects of the present invention will become manifest to those versed in the art upon making reference to the detailed description which follows and the accompanying sheet of drawings in which:

Figure 1 is a fragmentary top plan view of an automobile chassis having a parallelogram-type steering linkage equipped with an idler arm according to the present invention;

Figure 2 is an enlarged side elevational view with parts in section of the idler arm of the present invention; and Figure 3 is a cross-sectional view with parts in elevation taken on line III—III of Figure 2.

As shown on the drawing:

Referring first to Figure 1, there is shown a parallelogram-type vehicular steering linkage such as is frequently employed in automotive steering assemblies. The steering linkage is adapted to control the relative angular positioning of a pair of front wheels 10, 10 which are independently pivotally supported by wheel arms 11, 11 from the transverse beam 12 of an automobile frame which also includes side beams 13, 13.

The wheels 10, 10 are rotated on stub-axles (not shown) pivoted on king pins 14, 14. A pair of steering arms 16, 16 extend rearwardly from the stub-axle assemblies and a pair of tie rods 17, 17 are pivotally connected to each of the steering arms 16, 16 through a ball and socket type joint 18, 18. The tie rods 17, 17 extend inwardly and are pivotally connected by means of ball and socket type joint 19, 19 to a cross link 20 pivotally connected at one end to a pitman arm 21 suspended on the rock shaft 22 of a steering column gear box 23 carried on one of the side beams 13.

A steering column 24 may be rotated to actuate the rock shaft 22 and thereby swing the pitman arm 21 for longitudinal shifting of the cross link 20 whenever it is desired to selectively position the wheels 10 as in steering the vehicle.

In order to support the steering linkage in the proper geometric relationship and in order to properly transmit a steering load through a change of direction, an idler arm assembly indicated generally by the reference numeral 26 provides a movable joint between the other end of the cross link 20 and one of the side beams 13 of the vehicle frame.

Referring more specifically to Figures 2 and 3, the idler arm assembly 26 is shown as including a bracket 27 which in its prefabricated form preferably takes the form of a flat plate-like piece of metal and is subsequently shaped to define a frame connecting portion 27a and a bearing housing portion 27b.

The frame connecting portion 27a retains its flat shape and is provided with a plurality of spaced apertures 28 through which suitable fasteners may be passed to secure the bracket 27 to the adjacent side beam 13 of the vehicle or to a suitable protuberance 29 appended thereto.

The idler arm proper, indicated by the reference numeral 30, may comprise an ordinary piece of steel bar stock suitably bent into the general configuration of a crank having oppositely extending parallel arm portions 30a and 30b connected by a central arm portion 30c to bring the linkage into proper relationship with the bearing house in the bearing housing portion 27b.

A resilient elastic sleeve-like bushing 31 snugly surrounds a portion of the arm 30a of the idler arm 30 adjacent one end thereof and serves as a bearing between the idler arm 30 and the bearing housing portion 27b when a pair of ear portions comprising the bearing housing portion 27b are curled to form a tubular bearing retainer, the cross-section of which being substantially circular.

As may be noted on the drawings, the respective abutting edges of the bearing housing portion 27b define male and female interlocking mating means such as a keystone-shaped lock stitch 32 so that the bearing housing portion 27b may be retained in a tubular shape and so that the bushing 31, the idler arm 30 and the bearing housing portion 27b of the bracket 27 may be placed in a snug and relatively predetermined angular relationship with respect to one another.

It will be appreciated that the idler arm when subjected to ordinary conditions of use will normally be moved through an arc of approximately 90°; however, with the bearing of the present invention there will be no relative movement between bearing surfaces since the angular displacement of the idler arm 30 will be completely accommodated by torsional movement in the bushing 31.

Because of the frictional engagement effected between the idler arm 30, the bushing 31 and the bearing housing portion 27b of the bracket 27, there will ordinarily be no axial movement of the arm portion 30a of the idler arm 30 relative to the bracket 27. Nevertheless, for purposes of safety, the end of the arm portion 30a of the idler arm 30 is provided with a threaded portion 33 which receives a nut 34 and which may be employed to maintain a washer 36 in abutting relationship to the bearing housing portion 27b. The nut 34 may be locked in a predetermined axial position on the threaded portion 33 by means of a cotter pin 37.

At the other end of the idler arm 30, a rubber bushed sleeve bearing assembly, indicated generally by the reference numeral 38 is provided to effect a pivotal connection between the idler arm 30 and the cross link 20. This assembly 38 includes a bearing sleeve 38a receiving the end 30b of the arm 30 in a rotatable relation, a rubber bushing 38b surrounding the sleeve and an eye end housing 38c on the end of the cross link 20. A rubber washer 38d overlies the top of the housing 38c and is covered by a metal cap 38e. This connection serves to snub the rotation of the cross link 20 about the axis of the arm portion 30b of the idler arm 30 while permitting misalignment which produces deflection of the resilient elastic bushing 31. It will be appreciated that the steering motion occurs between the metal sleeve bearing 38a and the idler arm 30.

In order to keep the bearing 38 in correct axial alignment on the arm end 30b, the arm 30b of the idler arm may be pinched to form ears 39 and the arm portion 30b has a threaded end 30d receiving a metal washer 38f underlying the housing 38c and a castellated nut and cotter pin locking means indicated generally by the reference numeral 40. The nut is drawn up on the threaded end 30d to abut the cap 38e against the ears 39.

It will be apparent that the construction described permits the employment of ordinary forms of commercially available bar stock which require no additional finishing operations on the arm portion 30a. Moreover, the provision of the resilient elastic bushing 31 functioning as a bearing between the bracket 27 and the idler arm 30 results in a permanent assembly which requires no lubrication and which substantially precludes the magnification or transmittal of rattle noises which frequently originate in the elements of a steering linkage.

Although various modifications might be suggested to those versed in the art, it should be understood that I do not wish to be limited to the precise details described in connection with the preferred embodiment herein set forth by way of illustrative example. Accordingly, it is intended that the scope of this patent extend to all such embodiments as reasonably and properly come within the scope of my contribution to the art.

I claim as my invention:

1. In a vehicular steering linkage, a metal bar bent into the general configuration of a crank and forming an idler arm, a resilient, snug-fitting, sleeve-like bushing surrounding a relatively angularly displaceable portion of the arm near one end thereof, a relatively stationary bracket having a portion thereof curled snugly around the bushing to form a tubular retainer therefor which is substantially circular in cross-section, the assembled relationship of the elements being such that rotation of the arm element relative to said bracket will produce only torsional movement in the bushing but no relative movement between the contacting bearing surfaces.

2. In a steering linkage, a piece of metal bar stock formed into the general configuration of a crank and comprising an idler arm, a resilient elastic bushing surrounding a relatively angularly displaceable portion of the idler arm near one end thereof, a relatively stationary bracket having a pair of ears curled snugly around the bushing to form a tubular retainer substantially circular in cross-section and locking elements defined by the ears to retain the housing in tubular shape and to insure that the assembled relationship of the elements will produce only torsional movement in the bushing upon angular displacement of the idler arm relative to the bracket.

3. In a vehicular steering linkage a metal bar shaped substantially to the general configuration of a crank and comprising an idler arm, a resilient, snug-fitting, sleeve-like bushing surrounding a relatively angularly displaceable portion of the idler arm, a flat plate-like bracket element, apertures defined by a portion of the bracket element to pass fastening means therethrough, another portion of the bracket element being curled snugly around the bushing to form a tubular housing therefor, fastening means connecting the bracket to the frame of the vehicle, a bearing on the other end of the idler arm and means connecting said bearing to a link of the steering linkage, said bushing arranged to accommodate relative angular movement between the idler arm and the bracket.

4. In a steering linkage of a vehicle, an idler arm comprising a metal bar shaped in the general configuration of a crank, a resilient sleeve snugly surrounding one arm of the crank near an end thereof adapted to be relatively angularly displaced and a bracket having a tubular portion snugly surrounding the sleeve, rotational movement of the idler arm relative to the bracket producing only torsional movement in the sleeve.

5. In a vehicular steering linkage, an angularly displaceable idler arm, a resilient sleeve snugly surrounding a portion thereof and a bracket adapted to be connected to a vehicle part relatively stationary with respect to said idler arm, said bracket being formed from a substantially flat plate and having a tubular housing portion defined by two oppositely extending ears curled to a substantially circular cross-section, said tubular housing portion snugly receiving the resilient sleeve so that rotational movement of the idler arm relative to the bracket will produce only a torsional movement in the sleeve.

6. In a vehicular steering linkage, an idler arm, a resilient sleeve snugly surrounding a portion thereof and a bracket, said bracket being formed from a substantially flat plate and having a tubular housing portion defined by two oppositely extending ears curled to a substantially circular cross-section, said idler arm and said bracket being relatively angularly displaceable, said tubular housing portion snugly receiving the resilient sleeve so that rotational movement of the idler arm relative to the bracket will produce only a torsional movement in the sleeve, the abutting edge portions of the ears defining mating elements of a male and female locking structure to retain the housing portion of the bracket in a tubular shape.

7. In a vehicular steering linkage, a vehicle frame idler arm, a resilient elastic material surrounding one end of the idler arm, a housing portion of a bracket member enclosing the resilient elastic material, fastening means connecting the bracket member to the side beam of the vehicle frame, a bearing on the other end of the idler arm and connecting means between the linkage and the bearing, whereby angular displacement of the idler arm relative to the bracket will produce only a torsional movement in the resilient elastic material.

8. In a vehicular steering linkage, an idler arm assembly comprising an idler arm, a rubber-like bearing on one end thereof, a bracket defining a housing portion snugly enclosing the bearing, locking means between the bracket and the idler arm to preclude relative axial movement therebetween, a metal bearing carried on the other end of the idler arm and a cross link connected to the metal bearing to angularly displace the idler arm, whereby angular displacement of the idler arm will produce torsional movement only in the rubber-like bearing.

9. In a structure for movably connecting the free end of a cross link on parallelogram-type vehicular steering linkage to the frame of the vehicle, a generally crank-shaped idler arm, a sleeve of resilient elastic material surrounding a portion of one end thereof, a bracket enclosing the resilient elastic material, means connecting the bracket to the frame, a bearing at the other end of the idler arm and means connecting the bearing to the free end of the cross link, whereby angular displacement of the idler arm will produce torsional movement only in the resilient elastic material and steering motion will be accommodated between the bearing and the cross link.

10. In a steering linkage of a vehicle, a vehicle frame idler arm, frame fastening means at one end of the idler arm including a resilient sleeve snugly surrounding a portion of the idler arm adapted to be relatively angularly displaced with respect to the vehicle frame, said frame fastening means further including a bracket having a tubular portion snugly surrounding the sleeve, and pivotal connecting means at the other end of said idler arm to connect said idler arm to the vehicular steering linkage and effecting movement of the idler arm relative to the bracket to produce only torsional movement in the sleeve.

11. In a vehicular steering linkage, an angularly displaceable idler arm, a resilient elastic, sleeve-like bearing carried at one end of the idler arm, a vericle frame bracket having a tubular housing portion surrounding the resilient elastic bearing and clamping said bushing and said idler arm in bonded assembly, locking means between the idler arm and the bracket to preclude relative movement axially with respect to said bearing, and connecting means at the other end of said idler arm for connecting said arm to the vehicular steering linkage, and for rotating said idler arm relative to said bracket within the elastic limits prescribed by the elasticity of the bearing.

12. In a vehicular steering linkage, an angularly displaceable idler arm, a resilient elastic bearing surrounding one end of said idler arm, a vehicle frame bracket member having a housing portion for connecting said one end of said idler arm to a vehicle frame, said housing portion and said idler arm being connected by said resilient elastic bearing only, and a bearing at the other end of said idler arm for connecting said idler arm to the vehicular steering linkage and for angularly displacing said idler arm relative to the bracket against the torsional resistance of said resilient elastic bearing within the elastic limit of the resilient elastic material of said resilient elastic bearing.

DONALD P. MARQUIS.

(References on following page)

References Cited in the file of this patent

UNITED STATES PATENTS

| Number | Name | Date |
|---|---|---|
| 131,671 | Eils | Sept. 24, 1872 |
| 1,862,027 | Lord | June 7, 1932 |
| 1,876,924 | Hastings et al. | Sept. 13, 1932 |
| 1,886,143 | Zaparka | Nov. 1, 1932 |
| 2,022,213 | Lord et al. | Nov. 26, 1935 |
| 2,068,474 | Schwinn | Jan. 19, 1937 |
| 2,152,506 | Thorne | Mar. 28, 1939 |
| 2,156,580 | Best | May 2, 1939 |
| 2,178,858 | Hufferd et al. | Nov. 7, 1939 |
| 2,346,574 | Guy | Apr. 11, 1944 |
| 2,448,851 | Wharam et al. | Sept. 7, 1948 |
| 2,464,982 | Leighton | Mar. 22, 1949 |
| 2,470,215 | Graham | May 17, 1949 |
| 2,479,339 | Gair | Aug. 16, 1949 |
| 2,488,979 | Kogstrom | Nov. 22, 1949 |

FOREIGN PATENTS

| Number | Country | Date |
|---|---|---|
| 753,892 | France | Oct. 26, 1933 |